US006793175B1

(12) United States Patent
Sanders et al.

(10) Patent No.: US 6,793,175 B1
(45) Date of Patent: Sep. 21, 2004

(54) SUPERSONIC EXTERNAL-COMPRESSION DIFFUSER AND METHOD FOR DESIGNING SAME

(75) Inventors: Bobby W. Sanders, Westlake, OH (US); Joseph L. Koncsek, Seattle, WA (US); Linda S. Hedges, Seattle, WA (US)

(73) Assignee: The Boeing Company, Seattle, WA (US)

( * ) Notice: Subject to any disclaimer, the term of this patent is extended or adjusted under 35 U.S.C. 154(b) by 394 days.

(21) Appl. No.: 09/382,437

(22) Filed: Aug. 25, 1999

(51) Int. Cl.$^7$ ............................................... B64D 33/02
(52) U.S. Cl. .................................... 244/53 B; 137/15.1
(58) Field of Search ............................. 244/53 B, 53 R, 244/62, 73 R; 137/15.1, 15.2

(56) References Cited

U.S. PATENT DOCUMENTS

| | | | |
|---|---|---|---|
| 3,430,640 A | * | 3/1969 | Lennard |
| 3,765,179 A | * | 10/1973 | Strang et al. |
| 3,941,336 A | * | 3/1976 | Nangia |
| 3,974,648 A | | 8/1976 | Kepler |
| 4,372,505 A | * | 2/1983 | Syberg |
| 4,378,097 A | * | 3/1983 | Ferguson et al. |
| 4,919,364 A | * | 4/1990 | John et al. |
| 4,991,795 A | | 2/1991 | Koncsek |
| 5,026,004 A | * | 6/1991 | Dobie et al. |
| 5,078,341 A | | 1/1992 | Bichler et al. |
| 5,116,251 A | * | 5/1992 | Bichler et al. |
| 5,301,901 A | | 4/1994 | Kutschenreuter |
| 5,347,807 A | * | 9/1994 | Brossier et al. |
| 5,397,077 A | | 3/1995 | Kutschenreuter |
| 5,447,283 A | | 9/1995 | Tindell |
| 5,586,735 A | * | 12/1996 | Falempin et al. |
| 5,881,758 A | | 3/1999 | Koncsek et al. |
| 6,079,667 A | * | 6/2000 | Gruensfelder |

FOREIGN PATENT DOCUMENTS

DE        3447 141 A1     7/1986

OTHER PUBLICATIONS

Louis G. Hunter; John M. Tripp; Douglas G. Howlett; A Mach 2.0 Plus Supersonic Inlet Study Using The Navier–Stokes Equations; 1985; pp. 1–11; General Dynamics Corporation; Fort Worth, Texas.

Antonio Ferri, Application of the Method of Characteristics to Supersonic Rotational Flow, Technical Note No. 1135, National Advisory Committee For Aeronautics, Washington, D.C., Sep. 1946.

* cited by examiner

*Primary Examiner*—Tien Dinh
(74) *Attorney, Agent, or Firm*—Alston & Bird LLP

(57) ABSTRACT

A supersonic external-compression inlet comprises a generally scoop-shaped supersonic compression section for diffusing a supersonic free stream flow. The supersonic compression section includes a main wall having a leading edge and a throat portion downstream of the leading edge, and side portions joined to opposite side edges of the main wall so as to form a generally scoop-shaped structure. The side portions advantageously extend into the supersonic flow stream far enough to encompass the initial oblique shock wave that is attached to the leading edge of the main wall. The main wall has an inner surface formed generally as an angular sector of a surface of revolution, the inner surface of the main wall coacting with inner surfaces of the side portions to define a three-dimensional external-compression surface. The supersonic external-compression inlet also includes a subsonic diffuser section arranged to receive flow from the supersonic compression section and to diffuse the flow to a subsonic condition. A variable-geometry inlet includes an external ramp hinged about its forward edge and forming a portion of the inner surface of the scoop-shaped diffuser, pivotal movement of the external ramp serving to vary a throat size of the inlet. The subsonic diffuser includes an internal ramp hinged about its aft edge for maintaining a smooth transition from the external ramp.

12 Claims, 3 Drawing Sheets

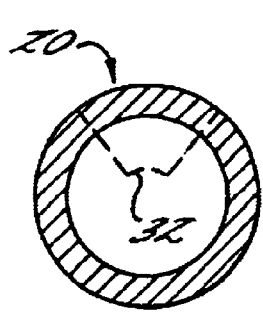
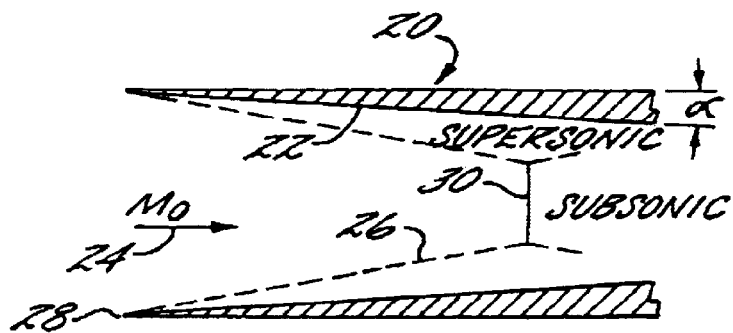
Fig. 2.
Fig. 1.
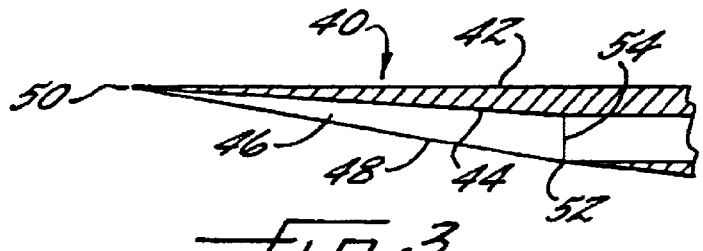
Fig. 3.
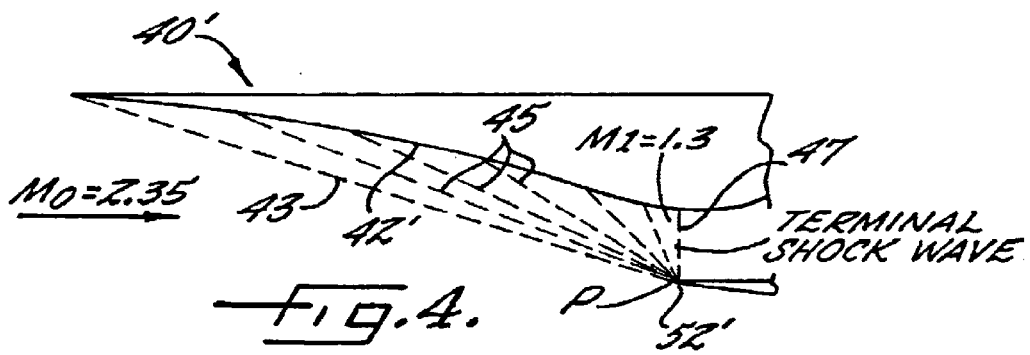
Fig. 4.
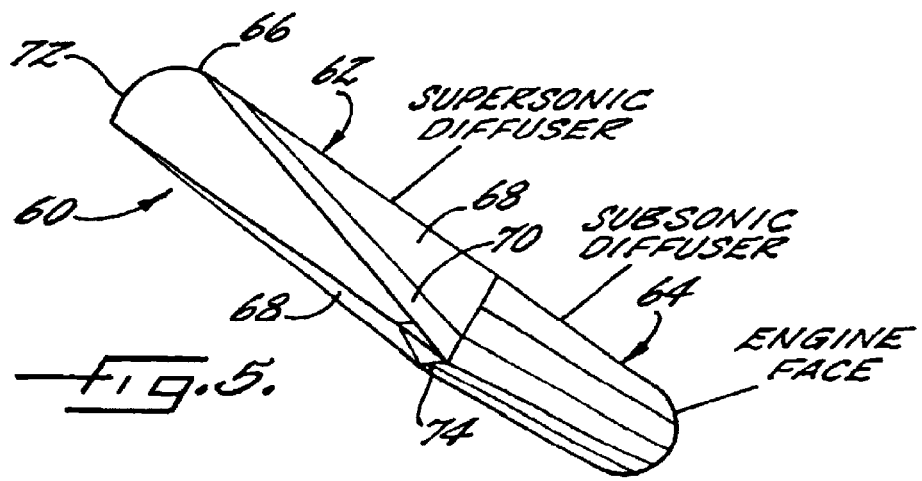
Fig. 5.

SUPERSONIC EXTERNAL-COMPRESSION DIFFUSER AND METHOD FOR DESIGNING SAME

FIELD OF THE INVENTION

The invention relates to supersonic diffusers. The invention relates more particularly to external-compression supersonic diffusers such as are used as inlets in air-breathing propulsion systems.

BACKGROUND OF THE INVENTION

In a variety of types of aircraft, air-breathing propulsion systems such as turbojet or turbofan engines are used for propelling the aircraft at supersonic velocities. Existing commercially available gas turbine engines used for aircraft propulsion are virtually invariably designed to work in a regime in which subsonic flow, typically on the order of Mach 0.3 to 0.6, exists at the upstream face of the engine. Thus, a supersonic diffuser or inlet is necessary to decelerate the captured supersonic air stream to a subsonic speed for ingestion by the engine. The process of deceleration is technically known as diffusion or compression, since the excess kinetic energy of the air stream is converted into a static pressure increase. To maximize the overall propulsive efficiency of the engine/inlet system, the inlet must perform its diffusion function efficiently. The efficiency of the diffusion process is a function of how much total pressure is lost in the air stream between the entrance side of the inlet and the discharge side. The total-pressure recovery of an inlet is defined by a ratio of total pressure at the discharge to total pressure at the entrance. A primary objective of inlet design is to maximize total pressure recovery. External drag on the inlet also affects the overall efficiency of the system, and thus it is desirable to minimize such drag. Additionally, a further objective of the inlet design process is to maximize flow stability so as to avoid violent flow oscillations, primarily unstart, that can occur with some types of supersonic inlets.

A supersonic inlet generally includes a forward portion comprising a converging supersonic diffuser, and an aft portion comprising a diverging subsonic diffuser. Most supersonic inlets are either two-dimensional or "2D" having a rectangular-shaped flow area, or axisymmetric having a circular flow area. A throat of the inlet occurs at the juncture between the supersonic diffuser and the subsonic diffuser where the flow area reaches a minimum. Supersonic inlets are generally classified into three types: internal compression, mixed compression, and external compression. Internal-compression inlets are designed to accomplish both supersonic and subsonic compression within the interior of the inlet duct, and thus the shock structure of the supersonic compression field must be "swallowed" into the inlet duct in order for the inlet to work as designed. The problem of "unstart" occurs in an internal-compression inlet when a flow disturbance causes the terminal shock to be expelled out the forward end of the inlet duct. The result is a drastic loss in efficiency and a large increase in inlet drag. Unstart thus represents a significant problem.

Mixed-compression inlets are those in which part of the supersonic compression is accomplished forward of the inlet duct aperture by forcing the approaching air stream to turn prior to being ingested into the duct. Supersonic compression continues internally in the forward part of the duct, followed by subsonic compression. These types of inlets can still suffer from flow instability problems such as unstart, since the terminal shock must still be swallowed into the duct as with internal-compression inlets.

External-compression inlets accomplish all supersonic compression externally such that the flow in the inlet duct is all subsonic. External-compression inlets are less susceptible to unstart-type instabilities because the terminal shock tends to remain stable in its position at the entrance to the inlet duct, which represents the throat of the inlet. However, external-compression inlets are typically disfavored for flight above about Mach 2.0 because they tend to have high cowl drag as a consequence of the large amount of flow turning that must be accomplished forward of the inlet duct. This large flow turning leads to high cowl angles and long cowl lengths in the cross-stream direction, and thus high drag.

It would be desirable to provide a supersonic inlet having good flow stability such as that typical of conventional external-compression inlets, and at the same time having high total-pressure recovery and low external drag.

SUMMARY OF THE INVENTION

The above needs are met and other advantages are achieved by the present invention, which provides an external-compression inlet having a unique three-dimensional external compression surface that can provide high total pressure recovery and low cowl drag while maintaining the good flow stability that is characteristic of external-compression inlets. To these ends, a supersonic external-compression inlet in accordance with a preferred embodiment of the invention comprises a generally scoop-shaped supersonic compression section for diffusing a supersonic free stream flow. The supersonic compression section includes a main wall having a leading edge and a throat portion downstream of the leading edge, and side portions joined to opposite side edges of the main wall so as to form a generally scoop-shaped structure. The side portions advantageously extend into the supersonic flow stream far enough to encompass the initial oblique shock wave that is attached to the leading edge of the main wall. The main wall has an inner surface formed generally as an angular sector of a surface of revolution, the inner surface of the main wall coacting with inner surfaces of the side portions to define a three-dimensional external-compression surface. The supersonic external-compression inlet also includes a subsonic diffuser section arranged to receive flow from the supersonic compression section and to diffuse the flow to a subsonic condition. The subsonic diffuser section is formed by a cowl shaped as a closed duct, the cowl having a leading-edge cowl lip spaced in a cross-stream direction from the throat portion of the main wall such that a throat of the supersonic inlet is defined proximate the cowl lip between the cowl and the throat portion. The three-dimensional external-compression surface of the inlet enables the external flow turning to be reduced relative to a conventional 2D or axisymmetric supersonic inlet, and accordingly the external cowl angle can be reduced. The unique scoop-shaped supersonic diffuser section also enables the cowl length in the cross-stream direction to be reduced relative to a diffuser of conventional type, because the three-dimensional compression surface does not completely surround the flow stream. Drag on the scoop-shaped diffuser section can thus be reduced relative to a conventional supersonic diffuser.

The invention also encompasses a variable-geometry inlet of simple construction. In accordance with a preferred embodiment of the invention, the main wall of the supersonic compression section includes a movable external ramp that pivots about its forward edge. The aft portion of the external ramp defines the throat portion of the main wall. Thus, the size of the throat can be varied by pivoting the ramp so as to vary the distance between the throat portion and the cowl lip. The cowl preferably also includes a movable internal ramp located aft of the throat. The internal ramp is pivotable about its aft edge and has a forward edge that is proximate the aft edge of the external ramp. The internal ramp is pivoted in concert with the external ramp so as to maintain a smooth flow transition therebetween. Advantageously, the external and internal ramps are formed by simple hinged plates. If desired, the external and internal ramps can be spaced apart slightly in the flow direction where they meet so as to create a slot that can be used for boundary layer bleed.

Various configurations of three-dimensional external-compression surfaces can be used in accordance with the present invention. Preferably, however, all such configurations should be shaped in accordance with a design method of the invention, in which the external-compression surface comprises a surface that is fit through streamlines that originate at the perimeter of an upstream capture area for the inlet. First, an axisymmetric design is performed to determine an axisymmetric compression surface having a compression field providing a compression field that yields good total pressure recovery. Next, the shape of the inlet capture area is prescribed such that the portion of the axisymmetric compression field that yields good pressure recovery is captured by the capture area. A portion of the capture area's perimeter is defined by an angular sector of the axisymmetric compression surface at the leading edge of the supersonic compression section. Streamlines from the axisymmetric flow solution are traced from a plurality of points located about the perimeter of the capture area. A surface fit through these streamlines defines the three-dimensional external-compression surface for the inlet.

In one embodiment of the invention, the inner surface of the main wall has a circular-arc shape in cross-section normal to the free-stream direction and subtends a constant circular-arc angle from the leading edge to the throat. Advantageously, the side portions of the supersonic compression section comprise two substantially planar side walls respectively joined to opposite side edges of the main wall and extending generally radially with respect to the circular-arc inner surface thereof, the side walls extending from the leading edge of the main wall to the cowl lip of the subsonic diffuser section and being joined to the cowl lip. Preferably, the supersonic compression section at a discharge end thereof defines a flow area configured as a sector of an annulus, the subsonic diffuser section at an inlet end thereof defines a flow area configured to substantially match that of the discharge end of the supersonic compression section, and the discharge end of the subsonic diffuser section defines a substantially circular flow area. The subsonic diffuser section desirably provides a smooth transition from the annulus sector flow area at its entrance to the circular flow area at its exit.

In accordance with a particularly preferred embodiment of the invention, the inner surface of the main wall is contoured in the flow direction so as to create an initial weak oblique shock wave at the leading edge of the diffuser followed by isentropic compression to a Mach number of about 1.3 at the throat. A series of Mach lines (shock waves of virtually no strength such that substantially no pressure loss occurs across them) radiate from the inner surface. The inner surface is designed such that at a predetermined flow condition the initial weak shock wave and the Mach lines all intersect at a common focal point spaced in the cross-stream direction from the throat portion of the main wall. The cowl lip is located substantially at the common focal point. This design enables the spillage drag of the inlet to be minimized by ensuring that the subsonic diffuser captures all or nearly all of the externally compressed flow.

The invention also encompasses a supersonic external-compression inlet integrated into an aircraft wing in an advantageous manner. The shape of the local wing surface is modified to fit part or all of the supersonic diffuser contour generated by the design procedure of the invention. The supersonic diffuser wall thus serves both as the diffuser surface and as the local wing surface. This leads to reduction in wetted surface area relative to an alternative design in which the wing surface and diffuser surface are separate members. The reduction in wetted area in turn provides reduced skin friction drag for the inlet/wing system.

The invention thus provides a unique supersonic diffuser, and method for designing such a diffuser, enabling a compression field substantially duplicating that of an axisymmetric compression surface to be produced with a scoop-shaped supersonic compression section that does not completely surround the flow stream. Accordingly, cowl drag can be reduced in view of the reduced cowl wetted area relative to an axisymmetric cowl. The short cowl length of the supersonic compression section also leads to reduced weight for the diffuser. Total pressure recovery of the diffuser is predicted by CFD modeling to be equal to the highest levels obtained in wind tunnel tests of mixed-compression inlets designed for the same flight Mach number. The diffuser is also predicted to provide the good flow stability that is typical of external-compression inlets.

BRIEF DESCRIPTION OF THE DRAWINGS

The above and other objects, features, and advantages of the invention will become more apparent from the following description of certain preferred embodiments thereof, when taken in conjunction with the accompanying drawings in which:

FIG. 1 is a sectioned side elevation of an axisymmetric supersonic diffuser of simple conical configuration for illustrating a first step of a design procedure in accordance with the present invention;

FIG. 2 is a front elevation of the axisymmetric diffuser of FIG. 1, on which is superimposed an inlet capture area in the form of a sector of an annulus;

FIG. 3 is a sectioned side elevation of a supersonic compression section of a diffuser in accordance with one embodiment of the present invention produced by tracing streamlines that originate at points about the perimeter of the inlet capture area shown in FIG. 2 and fitting a surface through those streamlines;

FIG. 4 is a view similar to FIG. 3, but showing an alternative embodiment of the supersonic compression section in which the compression surface is refined to produce an isentropic compression in which the initial oblique shock and a series of Mach lines all focus on a common focal point, the cowl lip of the subsonic diffuser being located substantially at this common focal point;

FIG. 5 is a perspective view of a diffuser in accordance with an embodiment of the invention;

DETAILED DESCRIPTION OF THE DRAWINGS

Figure 6:
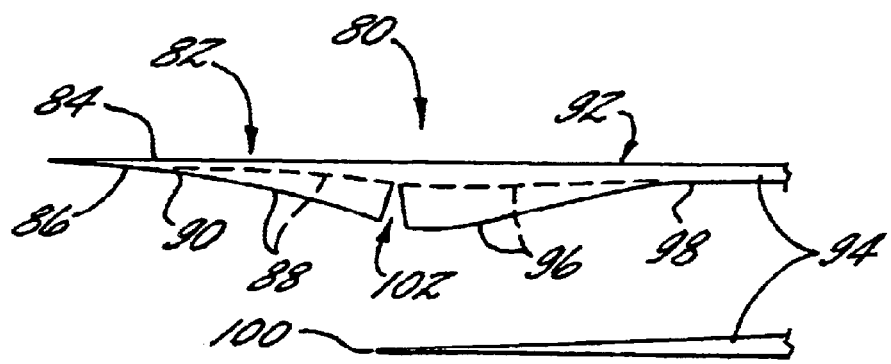
FIG. 6 is a sectioned side elevation of a variable-geometry supersonic external-compression diffuser in accordance with a preferred embodiment of the invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention is based on the concept that a supersonic compression field that essentially duplicates an axisymmetric compression field of a closed-duct axisymmetric diffuser can be created by a duct that only partially surrounds the flow stream. This is accomplished by configuring a three-dimensional compression surface that is fit through streamlines defined by the axisymmetric flow field. The three-dimensional compression surface is a generally scoop-shaped surface. The design process for determining the contour of the three-dimensional compression surface is explained with the aid of FIGS. 1–3.

FIG. 1 depicts a simple axisymmetric supersonic diffuser 20 formed as a body of revolution having a conical inner surface 22 that makes an angle α with the free stream flow direction denoted by the arrow 24. The free stream flow is parallel to the central longitudinal axis of the diffuser 20. Accordingly, an axisymmetric supersonic compression field is generated, which includes an initial oblique shock wave 26 originating at the leading edge 28 of the diffuser. The compression field includes a terminal shock 30 that is typically normal or near-normal and separates the supersonic flow field from the subsonic flow field. It is assumed here that the diffuser 20 is suitably designed so as to generate a desired supersonic compression field providing satisfactory pressure recovery. In accordance with the present invention, it is desired to design a three-dimensional compression surface that will generate essentially the same compression field with a non-axisymmetric diffuser structure.

FIG. 2 illustrates the next step in the design process for determining such a diffuser structure. An inlet capture area having a perimeter 32 is superimposed onto the axisymmetric flow field at the leading edge 28 of the diffuser 20. The capture area encompasses less than all of the flow contained by the axisymmetric compression surface 22. More particularly, the capture area is configured such that it captures that portion of the axisymmetric compression field that provides good pressure recovery. The capture area in this embodiment of the invention is configured as a sector of an annulus having an inner circular-arc segment that will define the projection of a cowl lip of a subsonic diffuser section of the diffuser, as further described below. The outer circular-arc segment of the perimeter defines the leading edge of the supersonic compression section of the diffuser. The perimeter 32 is bounded in the circumferential direction on opposite sides by straight radial line segments. A plurality of points are selected about the perimeter 32 of the capture area, and streamlines originating at these points are traced downstream based on the axisymmetric flow field solution for the axisymmetric diffuser 20. The objective of the streamline tracing procedure is to determine an internal contour of a non-axisymmetric diffuser structure that will encompass that part of the axisymmetric flow field that is usable, i.e., that part of the flow field that has good pressure recovery. One surface of that internal contour is defined by a circular-arc segment of the inner surface 22 of the axisymmetric diffuser 20, which can be thought of as a surface fit through streamlines that originate along the outer circular-arc segment of the perimeter 32. The objective is to determine the internal contours of side walls corresponding to the radial straight-line segments of the perimeter 32. The streamline tracing procedure in this particular case is simple, because the streamlines along a radial line segment will remain on a radial line as they proceed downstream in view of the axisymmetric shape of the streamtubes of the axisymmetric flow field. Accordingly, a surface fit through the streamlines is a radial plane. Thus, the side walls of the non-axisymmetric diffuser should have inner surfaces that are planar and are oriented radially. The side walls should extend into the supersonic flow stream far enough to encompass the initial oblique shock wave 26 that is attached to the leading edge 28 of the diffuser. Thus, free edges of the side walls should generally extend along a direction substantially corresponding to that of the initial shock wave 26 determined in the axisymmetric flow solution.

The supersonic compression structure resulting from this design procedure is shown in FIG. 3, which depicts a sectioned side elevation of the supersonic compression section 40. The supersonic compression section 40 includes a main wall 42 having an inner surface 44 that corresponds to the inner surface 22 of the axisymmetric diffuser 20 of FIG. 1. The supersonic compression section 40 also includes a pair of side walls 46 (only one visible in FIG. 3) whose inner surfaces are planar and radially oriented. The free edges 48 of the side walls 46 extend from the leading edge 50 of the main wall 42 to a cowl lip 52 that is placed so as to define a throat 54 of desired size between the cowl lip 52 and a throat portion of the main wall 42 opposite from the cowl lip 52. As further described below, the cowl lip 52 forms part of the subsonic diffuser section of the diffuser. The inner surfaces of the main wall 42 and side walls 46 collectively comprise the external-compression surface of the supersonic compression section 40.

A refinement to the above design procedure preferably is made in order to ensure that all of the supersonic compressed flow is captured by the subsonic diffuser. This refinement involves contouring the inner surface of the main wall in such a way that a weak initial oblique shock wave is generated from the leading edge of the main wall, and following the initial shock an isentropic compression process occurs such that there is substantially no additional total pressure loss up to the throat of the diffuser. Furthermore, the inner surface is contoured such that the initial shock and the series of Mach lines (which can be thought of as shocks of virtually no strength and thus no pressure loss) that radiate off the inner surface are all focused so as to intersect at a common focal point. This is illustrated in FIG. 4, which depicts an alternative embodiment of a supersonic compression section 40'. The inner surface 42' is contoured to produce the initial weak shock 43 and a series of Mach lines 45, all of which intersect at a common focal point P. The compression process is preferably designed so that the Mach number of the flow just ahead of the normal shock 47 at the throat is no greater than about 1.3. Preferably, the cowl lip 52' of the subsonic diffuser section is placed substantially at the focal point P so that the subsonic diffuser captures essentially all of the supersonic flow that is compressed through the initial shock 43 and the isentropic compression process. This placement of the cowl lip facilitates minimizing drag caused by spillage of supersonic compressed flow outside the subsonic diffuser section.

FIG. 5 depicts a perspective view of a complete supersonic inlet 60 in accordance with one embodiment of the invention. The inlet 60 includes a supersonic diffuser section 62 and a subsonic diffuser section 64. The supersonic diffuser section 62 is a generally scoop-shaped structure having a main wall 66 and a pair of opposite side walls 68. The inlet 60 has a capture area configured as a sector of an annulus, as previously described. The inner surfaces of the side walls 68 are planar and oriented radially with respect to the circular-arc-shaped inner surface of the main wall 66. Preferably, the outer surfaces of the side walls 68 are also planar and radial such that the side walls 68 comprise flat plate-shaped structures. The side walls 68 preferably include a bevel 70 on the external surface at the leading edge of each side wall for reducing the leading-edge thickness. The annulus-sector-shaped supersonic diffuser section 62 advantageously subtends a circular-arc angle of about 70°, although it will be appreciated that the circumferential extent of the supersonic diffuser section will vary for different inlet designs. The 70° arc angle of the supersonic diffuser section 62 preferably is constant from the leading edge 72 to the cowl lip 74. The subsonic diffuser section 64 is configured to provide a smooth transition between the entrance of the section 64, which has a flow area configured as an annulus sector, to the exit of the section 64, which has a circular flow area for mating with the circular front face of an engine.

The invention also enables a variable-geometry inlet to be produced with relatively simple movable elements. As known to those skilled in the art of supersonic inlet design, the size of the inlet throat that is desirable for supersonic cruise operation is smaller than that desirable for low-speed operation. Accordingly, it is common to provide movable members in supersonic inlets for varying the throat size. In conventional axisymmetric inlets, often relatively complicated movable members such as translating centerbodies or variable-diameter centerbodies are used for varying the throat size. In 2D inlets, collapsing hinged ramp designs have been proposed for supersonic inlets. Translating centerbody inlets tend to have limited operability margins (i.e., they provide acceptable pressure recovery and distortion levels at design-point operating condition, but when the engine moves off-design the pressure recovery and distortion levels rise in such a way as to significantly limit how far off-design the engine can be operated). They also tend to have limited transonic airflow capability. Variable-diameter centerbody inlets tend to be mechanically complex and pose maintenance and fabrication problems. Two-dimensional inlets tend to be heavy and may have higher installed drag than axisymmetric designs.

In accordance with the present invention, two simple hinged ramps can be used to vary the throat size of the diffuser. An embodiment of the invention incorporating this concept is depicted in FIGS. 6 and 7, which depict sectioned side and front elevations of a variable-geometry inlet 80.

Figure 7:
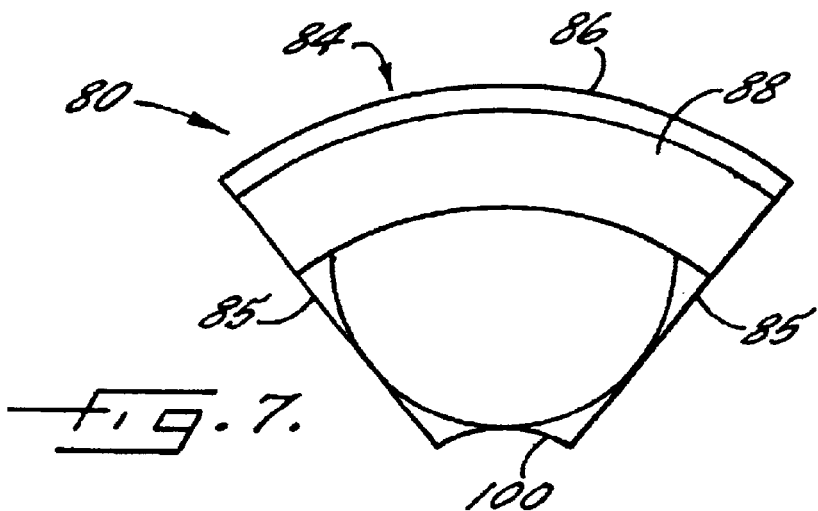
FIG. 7 is a front elevation of the diffuser of FIG. 6, shown magnified relative to FIG. 6.

The variable-geometry inlet 80 has a supersonic compression section 82 formed by a main wall 84 and side walls 85 (not shown in FIG. 6 for clarity). The main wall 84 includes an initial ramp 86 that is fixed and defines the leading edge of the main wall. The aft edge of the fixed ramp 86 is adjacent to a forward edge of a movable ramp 88. The movable ramp 88 is pivotable about a hinge axis 90 located at the forward edge of the ramp 88 and extending transverse to the free stream flow direction. The ramp 88 is shown in both a supersonic cruise position in solid line and in a low-speed position in dashed line in FIG. 6. The inlet 80 also includes a subsonic diffuser section 92 formed by a closed duct or cowl 94. The subsonic diffuser section 92 at an inlet end thereof defines a flow area configured to substantially match that of the discharge end of the supersonic compression section 82. The cowl 94 includes a movable ramp 96 whose forward edge is proximate the aft edge of the external ramp 88. The ramp 96 is pivotable about a hinge axis 98 located at the aft edge of the ramp 96, and is shown in both a supersonic cruise position in solid line and in a low-speed position in dashed line. The size of the throat of the inlet 80 is determined by the locations of the ramps 88, 96 in relation to the cowl lip 100 formed by the portion of the cowl 94 that is opposite the ramps. Thus, for supersonic cruise operation, the ramps 88, 96 are placed in their positions closest to the cowl lip 100 as shown in solid lines. When it is desired to increase the size of the throat for low-speed operation, the ramps 88, 96 are moved essentially in concert away from the cowl lip 100. The ramps 88, 96 can be actuated in any suitable manner, such as by hydraulic actuators, pneumatic actuators, electric motors, or the like (not shown). Advantageously, the aft edge of the external ramp 88 and the forward edge of the internal ramp 96 are spaced apart in the flow direction so as to define a slot 102 therebetween. The slot 102 can be used for bleeding off boundary-layer flow at the throat.

Figure 8:
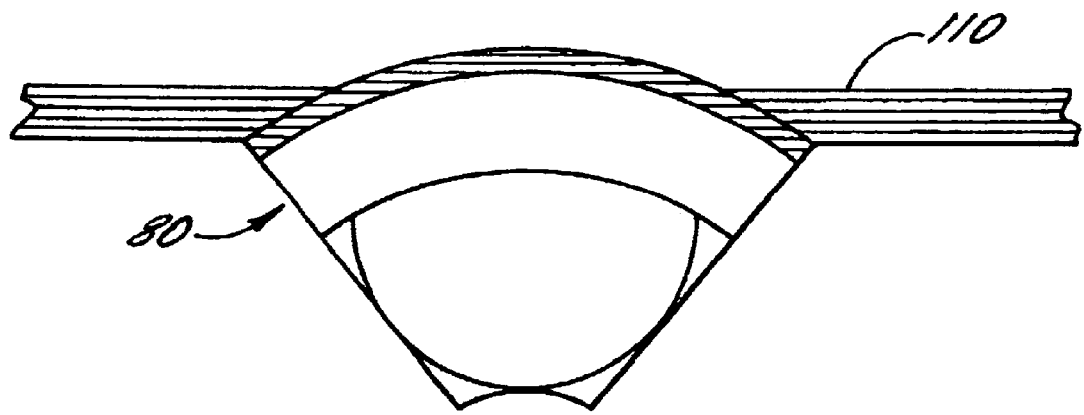
FIG. 8 is a front elevation of a diffuser integrated into a wing surface in accordance with another embodiment of the invention.

The present invention also provides an inlet/wing system enabling a supersonic inlet to be integrated with a wing in an advantageous manner. FIG. 8 schematically depicts such an inlet/wing system for the inlet 80 of FIGS. 6 and 7. A wing 110 is constructed to incorporate the inlet 80 such that at least part of the external-compression surface of the diffuser 80 forms a portion of the aerodynamic surfaces of the wing 110. The local shape of the wing surface is modified to fit part or all of the diffuser contour generated by the design method of the invention. This integration of the inlet 80 into the wing 110 may be a particularly low-drag integration scheme because the inlet 80 does double-duty, serving both as the local wing surface and as the external-compression surface for the inlet. The wetted surface area of the inlet/wing system can thereby be minimized, which can lead to reduced skin friction drag on the system.

Figure 9:
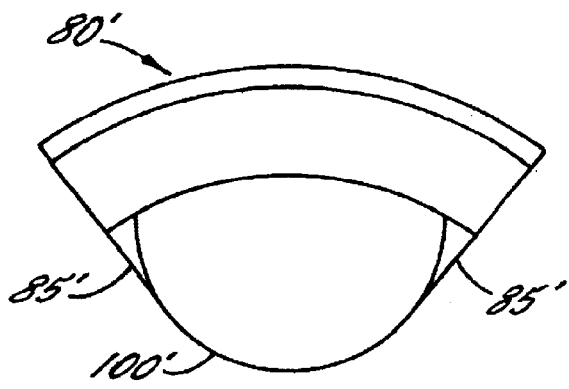
FIG. 9 is a front elevation of a diffuser in accordance with yet another embodiment of the invention having a capture area configured generally as a sector of an annulus but with rounded side walls and cowl lip.

The supersonic diffusers and inlets described above have capture areas formed strictly as a sector of an annulus, the side walls being planar. However, the invention is not limited to any particular capture area configuration. In fact, the design method of the invention can be applied to any arbitrarily selected capture area configuration. The method of the invention enables the capture area cross-sectional shape to be optimized for minimum installed drag or other design objective. For example, inlets can be designed in accordance with the invention to have capture area shapes that are circular, elliptical, or any other shape desired. FIG. 9 shows an example of the design method applied to an inlet 80' having a capture area formed generally as a sector of an annulus but with the side walls 85' being rounded and smoothly blending with the cowl lip 100'.

Figure 12:
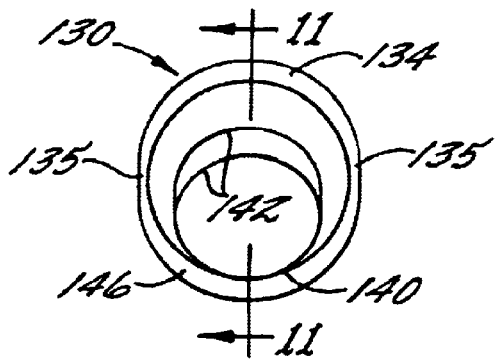
FIG. 12 is a front elevation of the diffuser of FIG. 11.
Figure 10:
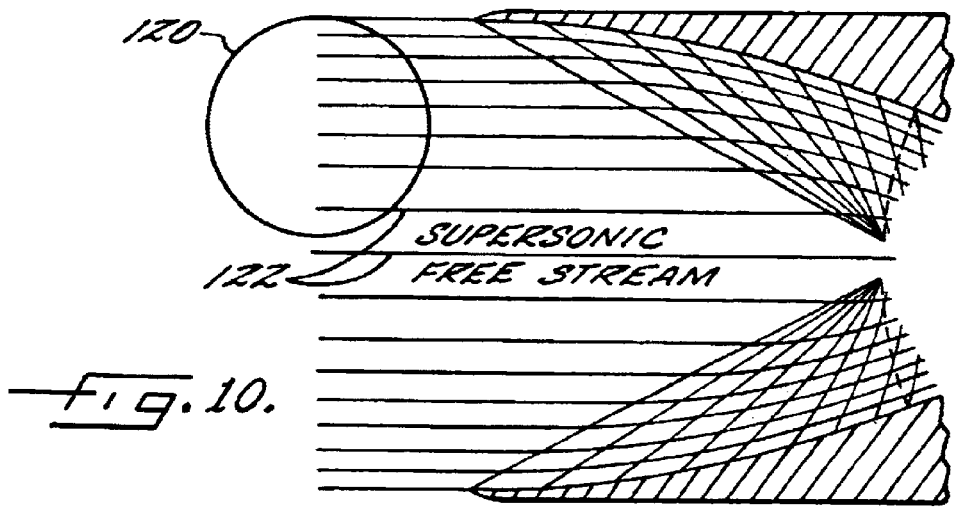
FIG. 10 is a sectioned side elevation of an axisymmetric supersonic diffuser showing a streamline tracing procedure for a circular capture area.
Figure 11:
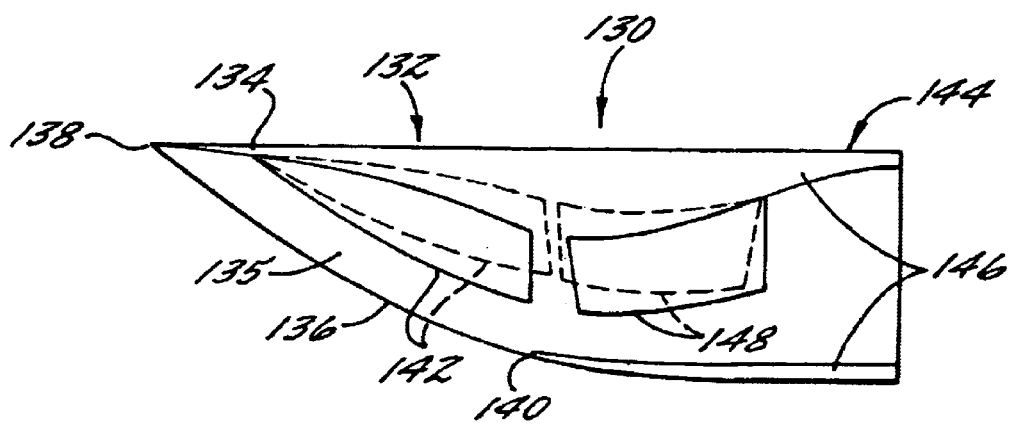
FIG. 11 is a sectioned side elevation of a diffuser produced by the streamline-tracing procedure of FIG. 10, illustrating the invention as applied to a circular capture area.

FIG. 10 depicts a streamline-tracing procedure of the present invention as applied to an axisymmetric flow field on which a circular capture area 120 is superimposed. The axisymmetric flow field is analyzed to trace streamlines 122. Those streamlines that pass through the perimeter of the capture area 120 are used to fit a surface. This surface becomes the external-compression surface for a supersonic diffuser in accordance with the invention. A resulting inlet 130 is depicted in FIGS. 11 and 12. The inlet 130 includes a supersonic compression section 132 formed by a main wall 134 and opposite side walls 135. The inner surfaces of the main wall 134 and side walls 135 collectively form the external-compression surface determined by fitting a surface through streamlines traced as in FIG. 10. The side walls 135 have free or leading edges 136 that extend from the leading edge 138 of the main wall to the cowl lip 140. The leading edges 136 of the side walls are slightly bowed forwardly to facilitate a smooth blending of the side walls 135 with the cowl lip 140. The inlet 130 includes a movable external ramp 142 shown in both cruise (solid line) and low-speed (dotted line) positions that forms a portion of the inner surface of the supersonic compression section 132. The diffuser 130 also includes a subsonic diffuser section 144 formed by a closed duct or cowl 146. The subsonic diffuser section includes a movable internal ramp 148 shown in both cruise (solid line) and low-speed (dotted line) positions.

From the foregoing, it will be recognized that the present invention provides a unique supersonic diffuser or inlet and method for designing same. Computational fluid dynamics (CFD) analyses of diffusers designed in accordance with the invention indicate that the diffusers have the potential for pressure recoveries that are equal to the highest levels obtained in wind tunnel tests of conventional mixed-compression inlets designed for the same flight Mach number. The diffusers of the invention also enable external drag and weight to be reduced relative to conventional inlets. These advantages are possible while retaining the good flow stability characteristics of conventional external-compression inlets. Inlets designed in accordance with the present invention can be used in a variety of applications, including supersonic or hypersonic aircraft or missiles. It will also be recognized by those of ordinary skill in the art that the streamline-tracing design method of the invention could also be applied to the design of an exhaust nozzle aerodynamic surface to provide a short and low-weight nozzle.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An external-compression supersonic inlet comprising:
a supersonic compression section for diffusing a supersonic free stream flow, the supersonic compression section including a main wall having a leading edge and a throat portion downstream of the leading edge, the supersonic compression section having side portions joined to opposite side edges of the main wall so as to form a generally scoop-shaped structure, the main wall having an inner surface formed generally as a circumferentially extending portion of a surface of revolution, said inner surface of the main wall coacting with inner surfaces of the side portions to define a three-dimensional external-compression surface; and a subsonic diffuser section arranged to receive flow from the supersonic compression section and to diffuse said flow to a subsonic condition, the subsonic diffuser section being formed by a cowl shaped as a closed duct, the cowl having a leading-edge cowl lip spaced in a cross-stream direction from the throat portion of the main wall such that a throat of the supersonic inlet is defined proximate the cowl lip between the cowl and said throat portion, and the cowl having a discharge end spaced downstream from said throat.

2. The supersonic inlet of claim 1, wherein the inlet defines a capture area configured as a sector of an annulus.

3. The supersonic inlet of claim 1, wherein the inner surface of the main wall has a circular-arc shape in cross-section normal to the free-stream direction and subtends a constant circular-arc angle from the leading edge to the throat.

4. The supersonic inlet of claim 3, wherein the side portions of the supersonic compression section comprise two substantially planar side walls respectively joined to opposite side edges of the main wall and extending generally radially with respect to the circular-arc inner surface thereof, the side walls extending from the leading edge of the main wall to the cowl lip of the subsonic diffuser section and being joined to the cowl lip.

5. The supersonic inlet of claim 1, wherein the supersonic compression section at a discharge end thereof defines a flow area configured as a sector of an annulus, wherein the subsonic diffuser section at an inlet end thereof defines a flow area configured to substantially match that of the discharge end of the supersonic compression section, and wherein the discharge end of the subsonic diffuser section defines a substantially circular flow area.

6. The supersonic inlet of claim 1, wherein the inner surface of the main wall is contoured in the flow direction so as to create an initial weak oblique shock wave followed by isentropic compression characterized by a series of Mach lines such that at a predetermined flow condition said shock wave and Mach lines radiate from the inner surface of the main wall to a common focal point spaced in the cross-stream direction from the throat portion of the main wall.

7. The supersonic inlet of claim 6, wherein the cowl lip is located substantially at said common focal point of the shock waves.

8. The supersonic inlet of claim 1, wherein the inlet defines a circular capture area.

9. The supersonic inlet of claim 1, wherein the main wall includes a movable external ramp that is pivotable about a forward edge thereof spaced forward of the throat, the external ramp having an aft portion spaced opposite the cowl lip, pivotal movement of the external ramp serving to vary a flow area between the external ramp and the cowl lip.

10. The supersonic inlet of claim 9, wherein the cowl includes a movable internal ramp that is pivotable about an aft edge thereof spaced aft of the throat, the internal ramp having a forward portion proximate the aft portion of the external ramp, the internal ramp being pivotable in concert with the external ramp so as to vary a flow area of the throat.

11. The supersonic inlet of claim 10, wherein the forward portion of the internal ramp is spaced downstream from the aft portion of the external ramp so as to define a slot therebetween proximate the throat.

12. The supersonic inlet of claim 9, wherein the main wall includes a fixed ramp forward of the external ramp, a forward edge of the fixed ramp defining the leading edge of the main wall and an aft edge of the fixed ramp being adjacent the forward edge of the external ramp.

* * * * *